3,090,670
ZIRCONIUM DIOXIDE RECOVERY
Edgel P. Stambaugh, Montgomery, and Raymond A. Foos, Loveland, Ohio, assignors to National Distillers and Chemical Corporation, New York, N.Y., a corporation of Virginia
No Drawing. Filed June 18, 1959, Ser. No. 821,120
5 Claims. (Cl. 23—140)

This invention relates to a method for the preparation of finely divided zirconium and hafnium dioxides or hydrates thereof. More particularly, the invention pertains to a new and improved method for recovering purified, finely divided zirconium and/or hafnium dioxides from acidic solutions of these metals.

In U.S. Patent No. 2,783,126, zirconium dioxide is recovered from zirconium salt solutions by heating the solutions to a temperature ranging from 150° to 200° C. in a closed vessel for thirty minutes or more. Consistent with other prior art processes, the zirconium salt solutions were prepared by dissolving the zirconium salt or a solution thereof in an alkali metal carbonate solution. The preferred alkali metal carbonate is sodium carbonate, or soda ash. As set forth in this patent, zirconium dioxide yields exceeding 90% are only achieved by utilizing temperatures of about 200° C. or by extending the treatment period. Another disadvantage of the patented process is the contamination of the zirconium dioxide product with alkali metal oxide, which necessitates a separate purification or leaching step.

One object of this invention is to provide a method for recovering finely divided zirconium and/or hafnium dioxides or hydrates thereof which avoid the disadvantages of the prior art process. Another object of the invention is to provide a method for preparing these metal dioxides or hydrates which does not require the use of alkaline materials. A further object of the invention is to prepare zirconium and hafnium dioxides having a considerably lower aluminum, iron, magnesium, nickel, lead, etc. content than the metal salt feed material. Other objects will become apparent from the ensuing description of the invention, which will be primarily discussed with respect to zirconium, although it will be understood that hafnium dioxide or mixtures of zirconium and hafnium dioxides may also be prepared by the inventive process.

In accordance with the present invention, it has now been found that finely divided, purified zirconium dioxide can be prepared directly from acidic solutions of zirconium containing water. The process generally involves heating the zirconium-containing feed solutions to temperatures at least above the boiling point of said solution and usually above 140° C., preferably about 180° to 190° C., and under a superatmospheric pressure of at least 50 p.s.i., preferably about 150 to 200 p.s.i. The treatment will be continued for about 2 to 60 minutes, preferably about 5 to 10 minutes, which does not include the time required to heat the feed solution from room temperature to the treatment temperature. In accordance with the preferred method of operation, the solution undergoing the aforementioned treatment may be subjected to continuous agitation or stirring to achieve a more finely divided product. The resulting zirconium dioxide product precipitates from the solution, and the average particle size of the zirconium dioxide was found to range from about 0.5 to 20 microns, and usually about 1 to 5 microns. After the pressure has been released, the resulting slurry is filtered to recover the finely divided, solid hydrate of zirconium dioxide. If the zirconium-containing feed solution contains impurities such as aluminum, iron, magnesium, nickel, cobalt, lead, and the like, the zirconium dioxide product was found to have a decidedly lower content of these metallic impurities. For the purposes of this invention, hafnium which is usually associated with zirconium and is difficult to separate therefrom is not considered to be a metallic impurity.

The zirconium-containing acid solutions useful as the feed material in the present invention may be derived from any source. In general, however, crude or substantially pure zirconium tetrachloride is dissolved in water to give a mixture of zirconium oxychloride, hydrochloric acid and water. Acidic solutions of zirconium oxybromides and oxyiodides may be similarly prepared and used in this process. If it is desired to treat a mixture containing zirconium oxysulfate rather than the oxychloride, sufficient acid is added to the acid solution to obtain conversion to the oxysulfate. Thus, the zirconium salt solutions can contain hydrochloric acid, hydrobromic acid, hydroiodic acid, sulfuric acid, nitric acid, or mixtures thereof. Thiocyanic acid and organic acids, such as the acetates and formates, can also be employed for this purpose. Moreover, it is possible to use alkali metal zirconates, such as $Na_2ZrO_3$, and $Zr(OH)_4$ or hydrates thereof in preparing the feed material. It is also possible to prepare the zirconium dioxide feed by leaching zirconium cyanonitride, zirconium carbide or mixtures thereof with hydrochloric acid, sulfuric acid or nitric acid at temperatures ranging from about 110° to 250° C. The amount of zirconium dioxide present in the feed solution will range from about 5 to 250 grams per liter, preferably about 75 to 135 grams per liter. For example, solutions containing 246 grams per liter of zirconium dioxide can be prepared by dissolving $ZrOCl_2$ in water. The acid concentration, calculated as the total titratable acid including both free and combined acid, will be about 5 to 200 grams per liter, depending on the concentration of zirconium. It was further found that after treatment the acid concentration in the filtrate should not exceed about 15% in order to obtain quantitative yields. At higher acid concentrations the reaction is reversed and dissolution can occur. Consequently, low acid concentrations in the filtrate are preferred to achieve high yields.

In accordance with another embodiment of this invention, inert solid materials such as carbon, calcium sulfate, silicon dioxide, titanium dioxide, barium sulfate, etc. can be incorporated in the feed by adding them to the water prior to dissolution of the zirconium tetrachloride or after the dissolution has been completed. By utilizing this feature, it is possible to prepare intimate, uniform heterogeneous mixtures of the precipitated zirconium dioxide and the inert material. The zirconium dioxide-carbon mixtures obtained by this method could be readily briquetted and used in the preparation of high purity zirconium tetrachloride. The zirconium dioxide-calcium sulfate mixtures prepared by this coprecipitation method would have utility as a paint pigment. The amount of inert material employed can vary over a wide range.

This feature of the invention will be more fully illustrated below.

Any conventional type pressure kettle or vessel, such as a Parr autoclave, provided with agitation means, if desired, can be employed in carrying out the process of this invention. The process can be continuous or batchwise, and the dissolution step and the precipitation step can be carried out in the same vessel. After the heat treatment under pressure, as described above, has been completed, the pressure is released and the resulting mixture or slurry is filtered. However, if so desired, the filtration may be conducted in a pressurized filter by passing the slurry directly from the precipitator into the filter without releasing the pressure. The filter cake will contain the finely divided zirconium dioxide and inert material, if employed. In general, it is preferred to filter the mixture while it is still hot, i.e. at a temperature of about 60° to 90° C. to eliminate the tendency for peptization. The filter cake, if the filtrate contains metallic impurities is generally washed with water or an acid solution. An illustrative acid solution is 10% hydrochloric acid. Other mineral acids which may be employed for this purpose include sulfuric, nitric, and mixtures thereof. Calcination by any of the standard methods can be carried out on the metal dioxide product, if anhydrous or dehydrated metal dioxide is desired. One method involves heating the hydrate to 600° C. or higher. As noted above, the method of this invention results in the preparation of high quality finely divided zirconium dioxide in outstanding yields. The quality and fine state of subdivision of the product render it particularly desirable for many of the well known uses of zirconium dioxide. It has been found, for example, that zirconium dioxide so prepared is a superior grade ceramic tile-glazing component.

The following examples will serve to illustrate the practice of this invention:

EXAMPLE I

Stock solution of zirconium acid salts were prepared by dissolving crude zirconium tetrachloride in water followed by filtration to remove any of the unreacted material.

In the various runs listed below in Table A approximately 750 ml. of the stock solutions, having various concentrations of the zirconium dioxide and titratable acid, was added to a glass lined Parr autoclave equipped with a Teflon mixer coupled to a steel shaft. The zirconium dioxide was precipitated from the feed mixtures by heating to the specified temperature under the given pressures for the indicated time periods. The resulting slurries were then cooled to a temperature of about 70° to 90° C. and filtered. The filter cake so obtained was washed with a 10% hydrochloric acid solution at a temperature of about 70° to 80° C. The leached filter cake (zirconium dioxide hydrate) was calcined at 900° C. to remove water of hydration or dried at a lower temperature to remove surface water. Some of the pertinent operating conditions and results are set forth below:

*Table A*

| Run | Acid concentration (grams/liter) | | $ZrO_2$ conc. (grams/liter) | Temp. (°C.) | Pres. (p.s.i.) | Time (mins.) | Recovery (percent) |
|---|---|---|---|---|---|---|---|
| 1 | HCl | 78.8 | 79.70 | 180 | 150 | 60 | 99.3 |
| 2 | HCl | 78.8 | 79.70 | 180 | 155 | 15 | 98.8 |
| 3 | HCl | 78.8 | 79.70 | 150 | 50 | 60 | 0.0 |
| 4 | HCl | 78.8 | 79.70 | 175 | 100 | 30 | 94.8 |
| 5 | HCl | 146.2 | 72.40 | 180 | 150 | 15 | 96.5 |
| 6 | HCl / $H_2SO_4$ | 78.0 / 63.0 | 74.30 | 180 | 150 | 15 | 90.5 |
| 7 | $H_2SO_4$ | 202.0 | 88.98 | 180 | 150 | 15 | 0.0 |
| 8 | $H_2SO_4$ | 84.0 | 88.98 | 180 | 150 | 15 | 94.7 |
| 9 | HCl | 189.5 | 79.70 | 180 | 150 | 15 | 2.6 |
| 10 | HCl | 78.8 | 79.70 | 175 | 100 | 5 | 0.0 |
| 11 | HCl | 78.8 | 79.70 | 150 | 50 | 5 | 0.0 |
| 12 | HCl | 163.0 | 80.00 | 180 | 150 | 15 | 61.0 |
| 13 | HCl | 148.2 | 144.95 | 180 | 150 | 15 | 47.3 |
| 14 | HCl | 135.0 | 78.25 | 180 | 150 | 15 | 99.5 |
| 15 | HCl | 139.5 | 134.75 | 180 | 150 | 15 | 97.9 |
| 16 | HCl | 78.8 | 79.70 | 180 | 150 | 15 | 99.2 |

The above data show that outstanding yields of finely divided zirconium dioxide are achieved by utilizing a temperature of at least 175° C. and a pressure as low as about 100 p.s.i. It should also be noted that it was possible to obtain excellent yields in treatment time periods of about 5 minutes. The zirconium dioxide concentration in the feed solution is preferably maintained below 135 grams per liter with acid concentrations of less than about 147 grams per liter, although higher concentrations of the zirconium dioxide could be employed provided the acid concentration is kept below the foregoing figure.

The process of this invention has the further advantage of substantially reducing the metallic impurity content of the zirconium dioxide. This is more clearly shown in Table B as follows:

*Table B*

4621 ppm. unless otherwise indicated

| Impurities | Crude $ZrCl_4$ | Run 1 | Run 16 |
|---|---|---|---|
| Aluminum | [1] 0.1–1.0 | <20 | 25 |
| Iron | 4,500.0 | 50.0 | 40.0 |
| Magnesium | 300.0 | <10.0 | <10.0 |
| Manganese | 30.0 | <5.0 | <5.0 |
| Nickel | 70.0 | 10.0 | <10.0 |
| Lead | 25.0 | <10.0 | <10.0 |
| Silicon | 75.0 | 95.0 | 90.0 |
| Tin | <5.0 | <5.0 | <5.0 |
| Titanium | 20.0 | 20.0 | 20.0 |
| Vanadium | <10.0 | <10.0 | <10.0 |
| $Hf \times 100/Hf+Zr$ | [1] 0.59 | [1] 0.60 | [1] 0.74 |

[1] Percent.

The data in Table B demonstrate that the process of this invention not only leads to superior yields of finely divided zirconium dioxide, but that it also results in reducing a number of metallic impurities below contaminating levels in one step. This is particularly important when the production of high quality zirconium dioxide is desired.

As has been previously described, it is possible to add inert materials such as carbon to the zirconium-containing feed solutions to obtain as the product an intimate, uniform, heterogeneous mixture of finely divided zirconium dioxide and inert material. The use of carbon, e.g. in the form of lampblack, is particularly desirable in this method of operation, since it also serves as a filter aid in separating the precipitated zirconium dioxide from the supernatant liquid. This aspect of the invention is illustrated below.

EXAMPLE II

A slurry containing 11.5 grams of lampblack and 750 ml. of a solution having a zirconium dioxide content of 77.1 grams per liter and a hydrochloric acid content of 78.8 grams per liter was heated in the Parr autoclave with continuous stirring at a temperature of about 180° C. and under a pressure of about 150 p.s.i. for about 15 minutes. The resulting mixture was cooled to a temperature of about 70°–90° C., residual pressure released and filtered. An intimate, heterogeneous mixture of finely divided zirconium dioxide and lampblack was recovered and upon analysis showed a 99% recovery of zirconium oxide.

The same crude zirconium tetrachloride was employed in both Examples I and II. The product recovered in Example II analyzed: 35 p.p.m. aluminum, 10 p.p.m. iron, and 5 p.p.m. magnesium.

EXAMPLE III

A solution containing 77.8 grams per liter of hydrochloric acid, 98.0 grams per liter of zirconium dioxide and 18.8 grams per liter of silicon dioxide was heated for 15 minutes at a temperature of 180° C. and under a pressure of 150 p.s.i. The resulting slurry was quenched to 70°–80° C. and filtered. The filter cake, containing an intimate mixture of finely divided zirconium dioxide and silicon dioxide, was washed with 10% hydrochloric acid to remove dilute acid soluble impurities. The yield was greater than 95% zirconium dioxide and >95% of the silicon dioxide.

As previously set forth, the process of this invention can be employed also in the preparation of hafnium dioxide and mixtures of hafnium dioxide and zirconium dioxide. An illustrative example of the latter preparation follows:

EXAMPLE IV

A feed solution containing 71.2 grams per liter of zirconium dioxide-hafnium dioxide (42% hafnium based on total zirconium plus hafnium in feed) and 98.8 grams per liter of hydrochloric acid was heated at 225° C. for 30 minutes under a pressure of about 350 p.s.i. The resulting slurry was filtered at a temperature of 70°–90° C. The filter cake so recovered was washed in 10% hydrochloric acid. A yield of 98.8% was achieved, and the product analysis indicated a greater than 99% hafnium dioxide plus zirconium dioxide content. The $$\frac{Hf \times 100}{Hf + Zr}$$

ratio in product was 42%.

While particular embodiments of this invention are shown above, it will be understood that the invention is obviously subject to variations and modifications without departing from its broader aspects. For example, the supernatant liquids recovered during the filtration step can be advantageously recycled to the dissolution step with or without retreatment depending on the amount of impurities present. The ability to re-use this supernatant liquid to recover residual zirconium dioxide and/or hafnium dioxide values without intermediate chemical treatment is obviously another advantage of the inventive process.

What is claimed is:

1. A process for preparing a purified dioxide of a metal selected from the group consisting of zirconium, hafnium and mixtures thereof, which consist of heating for about 2 to about 60 minutes an aqueous acidic solution of said metal, said solution containing an acid selected from the group consisting of hydrochloric acid, hydrobromic acid, hydroiodic acid, nitric acid, sulfuric acid, and mixtures thereof and having an acid concentration of about 5 to 200 grams per liter, at a temperature at least above about 140° C., at a pressure of at least 50 p.s.i., and in absence of alkaline material to precipitate purified metal dioxide, and recovering said precipitated, purified metal dioxide.

2. The process of claim 1 wherein said acid is hydrochloric acid.

3. The process of claim 1 wherein said acid is sulfuric acid.

4. The process of claim 1 wherein said temperature is within the range of about 180° to 190° C.

5. The process of claim 1 wherein said pressure is from about 150 to 200 p.s.i.

References Cited in the file of this patent

UNITED STATES PATENTS

| | | |
|---|---|---|
| 2,076,080 | George et al. | Apr. 6, 1937 |
| 2,204,454 | Teichmann et al. | June 11, 1940 |
| 2,285,443 | Kinzie et al. | June 9, 1942 |
| 2,783,126 | Richter | Feb. 26, 1957 |
| 2,889,232 | Linnell | June 2, 1959 |

OTHER REFERENCES

Blumenthal: The Chemical Behaviour of Zirconium, D., Van Nostrand Company, Inc., New Jersey, 1958, pages 154–157.

Mellor: Comprehensive Treatise on Inorganic and Theoretical Chemistry, Longmans, Green & Co., New York, vol. 7, pages 161 and 162, 1927.